United States Patent [19]
MacDonald

[11] Patent Number: 5,654,352
[45] Date of Patent: Aug. 5, 1997

[54] AIR-ENTRAINING AGENT AND METHOD OF PRODUCING SAME

[75] Inventor: William R. MacDonald, Fairview, N.C.

[73] Assignee: Maxflow Environmental Corp., Black Mountain, N.C.

[21] Appl. No.: 441,825

[22] Filed: May 16, 1995

[51] Int. Cl.$^6$ .................. C08L 89/00; C08L 93/04; C08L 29/04; C08K 5/098

[52] U.S. Cl. .................. 524/18; 524/17; 524/270; 524/394; 524/557

[58] Field of Search .................. 524/17, 21, 22, 524/23, 24, 25, 557, 270, 394, 18

[56] References Cited

U.S. PATENT DOCUMENTS

| | | | |
|---|---|---|---|
| 1,344,058 | 6/1920 | Nilsson | 106/661 |
| 1,466,083 | 8/1923 | Bo | 106/705 |
| 1,574,252 | 2/1926 | Marczinczek | 106/706 |
| 2,516,342 | 7/1950 | Randall et al. | 106/92 |
| 2,576,820 | 11/1951 | Barnes et al. | 524/17 |
| 2,873,036 | 2/1959 | Noble | 214/2 |
| 2,880,101 | 3/1959 | Ulfstedt | 106/87 |
| 2,915,301 | 12/1959 | Selden | 259/147 |
| 2,976,025 | 3/1961 | Pro | 259/154 |
| 3,134,579 | 5/1964 | Booth, Sr. | 259/149 |
| 3,562,381 | 2/1971 | Sakurada et al. | 524/24 |
| 3,625,723 | 12/1971 | Sicka | 106/86 |
| 3,871,628 | 3/1975 | Pulk et al. | 259/165 |
| 4,040,852 | 8/1977 | Jones | 106/97 |
| 4,050,950 | 9/1977 | Brewer et al. | 106/97 |
| 4,268,316 | 5/1981 | Wills, Jr. | 106/97 |
| 4,328,037 | 5/1982 | Demirel et al. | 106/85 |
| 4,374,672 | 2/1983 | Funston et al. | 106/97 |
| 4,501,618 | 2/1985 | Gebhard et al. | 106/109 |
| 4,548,507 | 10/1985 | Mathis et al. | 366/20 |
| 4,624,711 | 11/1986 | Styron | 106/308 S |
| 4,635,724 | 1/1987 | Bruckdrofer et al. | 166/268 |
| 4,708,745 | 11/1987 | Schonhausen | 106/85 |
| 4,731,120 | 3/1988 | Tuutti | 106/97 |
| 4,741,782 | 5/1988 | Styron | 106/309 |
| 4,828,619 | 5/1989 | Matsushita et al. | 106/95 |
| 4,871,283 | 10/1989 | Wright | 405/263 |
| 4,997,484 | 3/1991 | Gravitt et al. | 106/708 |
| 5,013,157 | 5/1991 | Mills et al. | 366/13 |
| 5,051,031 | 9/1991 | Schumacher et al. | 405/129 |
| 5,061,318 | 10/1991 | Casey et al. | 106/705 |
| 5,084,102 | 1/1992 | Brouns et al. | 106/707 |
| 5,085,708 | 2/1992 | Moriya et al. | 106/819 |
| 5,106,422 | 4/1992 | Bennett et al. | 106/705 |
| 5,110,362 | 5/1992 | Hoarty et al. | 106/708 |
| 5,137,753 | 8/1992 | Bland et al. | 427/180 |

FOREIGN PATENT DOCUMENTS

| | | | |
|---|---|---|---|
| B-10 96 815 | 1/1961 | Germany. | |
| A-20 30 351 | 3/1971 | Germany. | |
| 0646210 | 2/1979 | U.S.S.R. | 524/24 |
| 506 949 | 6/1939 | United Kingdom. | |
| 588524 | 5/1947 | United Kingdom. | |

OTHER PUBLICATIONS

Abstract No. 168400, Chemical Abstracts, vol. 122, No. 14, Apr. 3, 1995.
Abstract No. 191721s, Chemical Abstracts, vol. 108, No. 22, May 30, 1988.
Abstract No. 48101y, Chemical Abstracts, vol. 89, No. 6, Aug. 7, 1978.
Abstract No. 33525d, Chemical Abstracts, vol. 86, No. 6, Feb. 7, 1977.
Database WPI, Section CH, Week 7725.

*Primary Examiner*—Peter A. Szekely
*Attorney, Agent, or Firm*—D. Peter Hochberg; Mark Kusner

[57] ABSTRACT

An air-entraining agent for use in cementitious mixtures having fly ash. The air-entraining agent being particularly well suited for use with high carbon or high LOI fly ash.

35 Claims, No Drawings

AIR-ENTRAINING AGENT AND METHOD OF PRODUCING SAME

FIELD OF THE INVENTION

The present invention relates to an air-entraining agent for use in cementitious mixtures having fly ash. More particularly, the present invention is directed to an air-entraining agent for utilization in a process to volumetrically introduce controlled percentages of entrained air into cementitious mixtures having high Loss On Ignition (LOI) or high carbon fly ash.

BACKGROUND OF THE INVENTION

Fly ash is a finely divided residue that results from the combustion of pulverized coal. For example, fly ash is a by-product of coal combustion in the generation of electrical power by coal-fixed power stations. Fly ash is collected in particulate control systems which remove the ash from the flue gases rising from the combustion chamber of a power station boiler. The ash is then transferred to a storage silo, sluiced to an ash pond or landfilled.

Fly ashes are fine powders generally comprised of spherical or rounded glassy particles. Chemically, fly ash particles are primarily comprised of variable silica, alumina, and iron oxide content. The percentages of these chemicals found in the residue vary depending on the type of coal burned. Angular particles found in fly ash compositions may include other mineral particles, unburned coal or char. Furthermore, fly ash is a pozzolan, accordingly, it reacts with calcium hydroxide to form additional cementitious compounds in binders, such as Portland cement.

There are two primary classes for fly ash recognized by the American Society for Testing Materials (ASTM). Class C fly ash is the residue resulting from the combustion of lignite or sub-bituminous coal. Class C fly ashes are recognized as having some cementitious properties, as well as pozzolanic properties, due to the presence of appreciable calcium oxide (CaO) in their chemical composition. Class F fly ash is the residue resulting from the combustion of bituminous or anthracite coal. While Class F fly ash is a pozzolan, in itself it has no cementitious properties.

Annual production of fly ash is estimated to be 80 million tons, making it one of the most abundant industrial by-products in the world. At the present time only about 6 to 10 percent of this material is consumed through utilization, the balance is being land filled. Accordingly, fly ash utilization is a benefit to the environment, as it lessens the strain on ever decreasing available landfill space.

Air-entraining agents produce minute air bubbles on the order of 1.0 to 0.1 millimeters in diameter, that are uniformly distributed throughout a mixture of concrete and closed off from outside air so as to act as a kind of additional "fine aggregate". In general, air-entraining agents are made either from wood resins, vegetable or animal fats or oils, or the fatty acids or soaps of the latter, or from wetting agents or synthetic detergents.

In the prior art, it has been widespread practice to entrain air in Portland cement. Portland cement is a hydraulic cement produced by pulverizing Portland cement clinker usually containing calcium sulfate. The entrained air affects the properties of both fresh and hardened concrete produced using the Portland cement. In this respect, in properly proportioned fresh concrete, at equal slump, air-entrained concrete is considerably more workable and cohesive than similar non-air-entrained concrete, except at higher cement contents. Segregation and bleeding of "ordinary" Portland cement (OPC) mixtures (i.e., Portland cement mixtures without fly ash) are also reduced by the entrainment of air. As to hardened concrete, extensive laboratory testing and long-term field experience has demonstrated that properly air-entrained concrete can better resist the action of freezing and thawing.

The properties of fresh and hardened concretes comprised of Portland cement (PC) mixtures (i.e., Portland cement mixtures containing fly ash as either a mineral admixture or a direct cement replacement) and ordinary Portland cement (OPC) mixtures (i.e., Portland cement mixtures not containing fly ash), are similarly affected by entrained air. However, the presence of the fly ash in Portland cement (PC) mixtures may affect the air content in fresh concrete, as well as the stability of the entrained-air voids. Accordingly, use of fly ash in air-entrained concrete will generally require modifications to the dosage rate of the air-entraining admixture. In this respect, to maintain a constant air content, air-entraining admixture dosages must usually be modified depending on the carbon content, LOI, fineness, and the amount of organic material in the fly ash. For instance, fly ashes with LOI values equal to or greater than 3 percent will generally require a significant increase in the dosage of the air-entraining admixture. In contrast, fly ashes with LOI values less than 3 percent will generally require no appreciable increase in the air-entraining admixture dosage. It should be noted that fly ashes with an LOI of 6 percent or higher, as determined in accordance with ASTM C-618, are defined as high LOI or high carbon fly ashes (ASTM C-618 is a specification established for the use of fly ash, as a mineral admixture in Portland cement (PC) concrete). Class F fly ash, for instance, may have an LOI of as high as 30%. Factors affecting the LOI value in Class F fly ash include the type of coal burned, moisture content of the fuel, type of burner, combustion temperature, boiler demand, weather conditions, type of ash collection system, pollution control devices and techniques.

A typical air-entraining admixture is neutralized vinsol resin. Tests have shown that air-entraining admixtures comprised of neutralized vinsol resin do not perform well in cementitious mixtures having fly ashes with high LOI values. In this respect, carbon particles or char (i.e., organic unburned coal remnants) in the fly ash are porous and can have very high specific surface areas similar to that of charcoal. All forms of charcoal are porous and may be used to absorb gases and/or purify or clarify liquid. Accordingly, in Portland cement (PC) concrete containing high LOI fly ash, the carbon particles tend to absorb the air-entraining admixture liquor or liquid film (i.e., the lamellae) surrounding the air dispersion in the mixture. This action allows the air globule to escape. The problem of admixture absorption by carbon particles is further increased, if for example, the concrete mixture is subjected to prolonged mixing periods, or if the concrete mixture is subjected to pressure such as would be experienced within a pump line. The foregoing conditions can further complicate predicting an air content per dosage of air-entraining admixture in Portland cement (PC) concrete mixtures having high LOI or high carbon fly ash.

SUMMARY OF THE INVENTION

In accordance with a preferred embodiment of the present invention there is provided an air-entraining agent for introducing controlled percentages of entrained air into cementitious mixtures having fly ash. The air-entraining agent is comprised of water, a high-polymer protein, polyvinyl alcohol, and a soap gel. It should be understood that the term "soap" as used herein refers to any metallic salt of an acid derived from a fat.

According to another aspect of the present invention there is provided a method for producing the air-entraining agent. The method is comprised of the steps of mixing together water, a high-polymer protein powder, a polyvinyl alcohol aqueous solution and a soap gel solution.

According to a second preferred embodiment of the present invention there is provided an air-entraining agent for introducing controlled percentages of entrained air into cementitious mixtures having fly ash. The air-entraining agent is comprised of water, a colloid, a soap gel solution, a high-polymer protein powder, and a polyvinyl alcohol powder.

According to another aspect of the present invention there is provided a method for producing the air-entraining agent according to the second preferred embodiment. The method is comprised of the steps of mixing together water, a colloid, a soap gel solution, a high-polymer protein powder, and a polyvinyl alcohol powder. The mixture is heated to within the range of 185° F.–195° F. A homogenization process follows within 30 minutes.

It is an object of the present invention to provide an air-entraining admixture which overcomes the absorption characteristics of the carbon or char particles found in fly ash compositions.

It is another object of the present invention to provide a chemical air-entraining agent which produces and maintains a predictable air void system within cementitious mixtures and slurry having high LOI or high carbon fly ash.

It is another object of the present invention to provide an air-entraining agent which may be introduced directly to a Portland cement (PC)/fly ash mixture.

It is still another object of the present invention to provide an air-entraining agent which may be introduced as a pre-formed foam to a Portland cement (PC)/fly ash mixture.

It is yet another object of the present invention to provide a surface active air-entraining admixture that produces a bubble network with a high viscosity, metastable lamellae and resists absorption.

It is still another object of the present invention to provide an air-entraining admixture that does not separate during storage.

DETAILED DESCRIPTION

The present invention focuses on the lamellae (i.e., the liquid film) surrounding the individual gas (i.e., air) globules entrained within a Portland cement (PC)/fly ash mixture. A surface active air-entraining admixture that produces a bubble network with a high viscosity, roetastable lamellae and resistance to absorption, allows Portland cement (PC) concrete mixtures having high LOI or high carbon fly ash to be predictably air entrained.

There are two preferred methods for introducing the air-entraining agent of the present invention to a PC/fly ash concrete mixture. In this regard, the air-entraining agent may be introduced directly or as a pre-formed foam. In the direct method, the air-entraining agent is introduced by direct dosage to a PC/fly ash concrete mixture. The direct dosage intentionally traps air during the mixing process.

With respect to the pre-formed foam method, the air-entraining agent is introduced as a pre-formed foam through the use of a conventional foam generator. The foam may be added to a plastic PC/fly ash concrete mixture during mixing in predetermined portions to achieve extremely accurate (i.e., predictable) air contents in the PC/fly ash concrete mixture. In this respect, when the air-entraining agent is to be introduced as a pre-formed foam, it will take the form of a dispersion network of known volume. Accordingly, the air content of the foam can be easily determined before the foam is added to the PC/fly ash concrete mixture. Even in situations where air losses are experienced due to the high LOI of the fly ash, prolonged mixing periods, loss through pumplines, etc., a calculation for volumetric compensation of the air loss can be readily formulated. In flowable slurry mixtures (i.e., mixtures of only PC/fly ash and water) the foam creates a colloidal system which stabilizes the gas dispersion and particle suspension of the mixture. The colloidal system produces a uniform air void spacing mechanism maintainable in highly fluid or plastic, flowable mixtures.

According to a preferred embodiment of the present invention, the air-entraining agent is generally comprised of a polyvinyl alcohol aqueous solution (PVOH), a soap gel solution and a gelatin solution. PVOH will refer to polyvinyl alcohol in the form of an aqueous solution for the purposes of this application.

The PVOH solution is comprised of a polyvinyl alcohol powder (PVA) and water. PVA will refer to polyvinyl alcohol in the form of a powder for the purposes of this application. Where the PC/fly ash mixture has an LOI less than approximately 9 percent, or where the PC/fly ash mixture is designed to exhibit flow characteristics, a medium viscosity/molecular weight (MVMW) PVOH solution is preferred. In this respect, the MVMW PVOH solution has been determined to be less resistant to absorption by hydrophilic char particles than a high viscosity/molecular weight (HVMW) PVOH solution. The MVMW PVOH solution can, when modified, exhibit superior flow properties in plastic PC/fly ash mixtures. Where the PC/fly ash mixture has an LOI equal to or greater than approximately 9 percent, a HVMW PVOH solution is preferred. It should be noted that the term "molecular weight" refers to a weight average molecular weight.

It should be appreciated that various grades of PVA may be used to produce the MVMW PVOH and HVMW PVOH solutions. In this respect, various grades of PVA may be used to produce PVOH solutions having different viscosities, while at the same time having identical percentages of PVA solids in the solution. This is accomplished by structuring the molecular weight of the PVA solids. Table 1 set forth below shows the relationship of weight average molecular weight to viscosity in various PVOH solutions.

TABLE 1

| Viscosity Type* | Weight Average Molecular Weight |
| --- | --- |
| Low (3–6 CPS) | 11,000–31,000 |
| Medium (22–26 CPS) | 77,000–79,000 |
| High (40–50 CPS) | 106,000–110,000 |

*Viscosity at 4% (percentage of solids to water weight) aqueous solution at 20° C.

Among the desirable properties of the PVOH solution includes its variable water solubility, tensile strength, bonding properties, oil and grease resistance, and gel and film forming properties. Partially hydrolyzed and S-grade PVA solids also foam well, provided that defoamers are not used by the PVA manufacturer in the processing of their product.

The PVOH solution is approximately 4 to 12 percent PVA solids to water weight. The following steps are taken to form a PVOH solution in accordance with a preferred embodiment of the present invention. An MVMW PVA powder, an HVMW PVA powder, or blends thereof is dispersed in cool water. The powder is introduced slowly to avoid agglomeration. A medium speed mixer is used while adding the PVA powder. Furthermore, vortexing is avoided to prevent any air-entrainment during processing. The water temperature is then raised while the mixture is stirred at a rate that will assure contact of all of the PVA particles with the water. The temperature should be raised to a dissolution temperature, which is a minimum of 185° F. (85° C.) and a maximum of 195° F. (90.5° C.). The dissolution temperature is maintained for approximately 30 minutes to assure complete dissolution.

When the resulting PVOH solution is diluted and charged into a foam generator, a generally stable, viscous foam is produced. The foam network is metastable and the gas dispersion is stable within the foam network since the rate of lamellae thinning (which typically dictates when a bubble will finally rupture) is slow. However, the foam is very tacky. Accordingly, it is difficult to mix the foam into a PC/fly ash mixture and achieve uniform particle suspension around each dispersion of gas. This difficulty arises because the lamellae of each air globule in the foam network becomes adhered to its neighbors on all sides. Furthermore, the lamellae also lacks the desired property of elasticity. Accordingly, a soap solution in the form of a gel is used to overcome the foregoing difficulties.

A soap gel solution in accordance with a preferred embodiment of the present invention is generally comprised of a tall oil rosin (i.e., acidic rosin), an alkali, and water. Preferably, the tall oil rosin is derived from crude tall oil, such as the tall oil rosin sold under the trademark PAMITE 79. PAMITE 79 has a minimum acid number of 162 and contains a maximum of 3 percent fatty (oleic) acid. The tall oil rosin is reacted with an alkali, such as sodium hydroxide, potassium hydroxide, or other suitable metal salt, to form a soap. It should be appreciated that PAMITE 79 is described solely for the purpose of illustrating a preferred embodiment of the present invention. Other tall oil rosin products (such as those from Union Camp) are also suitable for use in the present invention.

The following steps are taken to form a soap gel solution according to a preferred embodiment of the present invention. The alkali (e.g., sodium hydroxide, potassium hydroxide, or other suitable metal salt) is added to cool water. The water and alkali mixture is then heated to a temperature of approximately 190° F. The tall oil rosin is then slowly added to the water and alkali mixture. It should be noted that the tall oil rosin is reacted in water at a ratio of approximately 8%–12% (preferably 10%) alkali to the total tall oil rosin weight. While the tall oil rosin is not water soluble, it is a thermoplastic material. Accordingly, the slow addition of the tall oil rosin into the heated mixture while mixing assures a fast and complete reaction with the alkali. A medium mixing speed is maintained to avoid vortexing and prevent air entrainment during processing. After several hours (e.g., four or more hours), the mixture yields a viscous soap gel solution. The resulting soap gel solution is then blended by mixing with the PVOH solution discussed above.

The soap gel solution reduces the surface tension and tackiness of the foam network discussed above. In this respect, the soap gel solution reduces the tackiness of the lamellae within the foam network while maintaining the viscosity. Accordingly, the mixing difficulty encountered with the PVOH solution discussed above is solved with the addition of the soap gel solution. Each air globule and its encapsulating film, can act and move independently of one another. This in turn allows the mixed particles to suspend completely around each dispersion of gas in a uniform manner providing a desirable air void spacing within. This also greatly improves the flow properties of the PC/fly ash mixtures. However, the dispersion has a tendency to rupture, due to a lack of lamellae elasticity. Therefore, a gelatin solution is used to improve the elasticity property of the mixture.

A gelatin solution according to a preferred embodiment of the present invention is comprised of a natural high-polymer protein powder (i.e., gelatin powder) and water. It will be appreciated that while various latex compounds may be substituted for the high-polymer protein, they may offer mixed results, and are generally more expensive. The natural high-polymer proteins are commercially available water-soluble proteins, which are obtained by boiling collagen with limed water and evaporating off the solution. It should be noted that other uses of these high-polymer proteins include photographic emulsions, foodstuffs and adhesives.

The following steps are taken to form a gelatin solution according to a preferred embodiment of the present invention. Natural high-polymer proteins in a powder form are slowly added to water at a temperature in the range of approximately 140° F.–150° F. (60° C.–65° C.). A preferred gelatin solution is 2 to 12 percent high-polymer protein powder weight to the total weight of the air-entraining agent. While adding the natural high-polymer protein powder, the solution is mixed vigorously. Adequate mixing action is necessary during processing since gel particles swell and become very sticky when introduced to water. The mixing action continues until the high-polymer protein powder is completely dissolved, thus forming the gelatin solution.

The air-entraining agent of the present invention is produced by blending together in a batch mixer the three solutions discussed above. The PVOH solution and soap gel solution are produced in advance of the final blending procedure, since they require thermal and chemical processing. Once produced, these solutions may be placed in storage vessels and kept for future use. The PVOH solution is preferably stored in a plastic or lined steel tank to avoid discoloration of the solution caused by rust formation in unlined mild steel tanks. The discoloration is due to the generally low pH (e.g., pH=4–6 @6% aqueous solution) of the PVOH solution. Moreover, the PVOH solution should be protected from freezing and stored in sealed containers to avoid "skinning" (i.e., film formation) of the air exposed surface of the PVOH solution.

Table 2 set forth below provides the formula for a batch size of 100 U.S. gallons (378.54 liters) of a PVOH solution according to a preferred embodiment of the present invention.

TABLE 2

PVOH SOLUTION

|  |  | % by weight |
|---|---|---|
| Water | 739.4 lbs. (359.87 kg.) | 94.1% |
| PVA powder | 50.0 lbs. (22.68 kg.) | 5.9% |
| Batch Wt. | 789.4 lbs. (382.43 kg.) |  |
| Specific gravity | 1.016 (where $H_2O = 1$) |  |
| PVA powder bulk | 40.0 lbs. per cu.ft. |  |

TABLE 2-continued

PVOH SOLUTION

| | | % by weight |
|---|---|---|
| density | (640.75 kg. per cubic meters) | |
| pH (6% aqueous solution) | 4–6 | |
| Viscosity @ 25° C. | 22–50 CPS (medium to high) | |

It will be appreciated that the weight of the PVA powder may range between approximately 2%–12% of the total PVOH solution weight. The remaining percentage weight of the PVOH solution is comprised of water.

Table 3 set forth below provides the formula for a batch size of 100 U.S. gallons (378.54 liters) of a soap gel solution according to a preferred embodiment of the present invention.

TABLE 3

SOAP GEL SOLUTION

| | | % by weight |
|---|---|---|
| Water | 625.2 lbs. (283.59 kg.) | 72.1% |
| Tall oil rosin (PAMITE 79) | 220.0 lbs. (99.79 kg.) | 25.4% |
| Alkali | 22.0 lbs. (9.98 kg.) | 2.5% |
| Batch Wt. | 867.2 lbs. (393.36 kg.) | |
| Specific gravity | 1.045 (where $H_2O = 1$) | |
| Tall oil rosin (PAMITE 79) | 66.15 lbs. per cu.ft. | |
| | (1059.8 kg. per cubic meters) | |
| pH | 8.5–9.5 | |
| Viscosity | N/A (gel) | |

It will be appreciated that the weight of the tail oil rosin (i.e., acidic rosin) may range between approximately 15%–35% (preferably, 25%) of the total soap gel solution weight. Furthermore, the weight of the alkali may range between approximately 8%–12% (preferably, 10%) of the tall oil rosin weight. It should be understood that the ratio of the tall oil rosin weight to alkali weight will remain constant unless the add value of the acidic rosin changes. The remaining percentage weight of the soap gel solution is comprised of water.

Set forth below is step-by-step formula and procedure for producing a 110 gallon (416.39 liter) batch of the air-entraining agent according to a preferred embodiment of the present invention:

1. Fill a 110 gallon (416.36 liter) mixing vessel with 206 lbs. (93.44 kg.) or 24.73 gallons (93.61 liters) of water, at a temperature in the range of approximately 140° F.–150° F. (60° C.–66° C.).
2. Start mixing and slowly add 34 lbs. (15.42 kg.) of the high-polymer protein powder and continue mixing for approximately 30 minutes to form the gelatin solution.
3. Add 563 lbs. (255.38 kg.) of the PVOH solution to the already mixing gelatin solution in the vessel. Continue mixing for approximately an additional 15 minutes.
4. Add 142 lbs. (64.41 kg.) of the soap gel solution, and continue mixing for approximately an additional one hour and 15 minutes.
5. Transfer the resulting air-entraining agent to drums or pails.

Table 4 set forth below provides a list of the basic ingredients and basic properties for an air-entraining agent according to a preferred embodiment of the present invention. The air-entraining agent of the present invention allows air contents from 1 percent to as high as 85 percent to be accurately achieved.

TABLE 4

AIR-ENTRAINING AGENT

| | | % by weight |
|---|---|---|
| Water | 206.0 lbs. (93.44 kg.) @ approx. 140° F. (60° C.) | 21.8% |
| High-Polymer Protein Powder | 34.0 lbs. (15.42 kg.) | 3.6% |
| PVOH Solution | 563.0 lbs. (255.38 kg.) | 59.6% |
| Soap Gel Solution | 142.0 lbs. (64.41 kg.) | 15.0% |
| Batch Wt. | 945.0 lbs. (428.65 kg.) | |
| Specific Gravity | 1.035 (where $H_2O = 1$) | |
| pH | 8.5–9.5 | |
| Solubility | good with water | |
| Color | milk white to tan | |
| Odor | slight | |

It will be appreciated that the weight of the high-polymer protein powder may range between approximately 2%–12% of the total weight of the air-entraining agent. Furthermore, the soap gel solution may range between approximately 10%–25% of the total weight of the air-entraining agent. The weight of the PVOH solution is generally about 60% of the total weight of the air-entraining agent. The weight of the PVA solids in the PVOH solution may range between 2%–12% of the total weight of the air-entraining agent. It will be appreciated that the addition or subtraction of any percentage value (i.e., the high-polymer protein powder or soap gel solution) is compensated by an adjustment to the water content of the air-entraining agent to achieve a yield of 110 gallons (416.39 L).

According to a second preferred embodiment of the present invention the air-entraining agent includes a colloid (i.e., a substance that undergoes dispersion) and a homogenization step is performed. The added colloid and homogenization step prevent the air-entraining agent from separating (i.e., segregating) during storage of the air-entraining agent in packaging containers. Where the air-entraining agent has separated, mixing will be required before use. It has been found that the air-entraining agent may separate when stored where the temperatures cycle from hot to cool. In this respect, the high-polymer protein powder and soap gel solution tend to fall out of suspension from within the PVOH solution. Accordingly, in the alternative embodiment of the present invention the PVA powder and the high-polymer protein powder are hydrolyzed and thermally processed together in a colloid comprised of a bentonite/water gel solution. The alternative procedure allows cross-linking of the high-polymer protein powder and the PVA powder, to occur in a hydrosol of colloid media (i.e., a colloidal solution in water).

The colloid according to the second preferred embodiment of the present invention is Bentonite. Bentonite is a colloidal clay formed from the alteration of volcanic ash. Please note that other colloids are also suitable. When the Bentonite is mixed into cool water, a gel is formed.

The following steps are taken to produce a 110 gallon (416.39 liter) batch of the air-entraining agent according to an alternative embodiment of the present invention:

1. Fill a 110 gallon (416.36 liter) mixing vessel with 733.5 lbs. (332.72 kg) of cool water, at a temperature in the range of approximately 55° F.–65° F. (13° C.–8° C.).
2. Vigorously mix the water while slowly adding 11 lbs. (4.99 kg) of Bentonite. Continue mixing for approximately 15 minutes.

3. Continue mixing while slowly adding 142 lbs. (64.41 kg) of the soap gel solution (described above). Continue mixing for approximately 15 minutes.

4. Continue mixing while slowly adding 34 lbs. (15.42 kg) of the high-polymer protein powder (described above).

5. Continue mixing while slowly adding 35.5 lbs. (16.10 kg) of the PVA powder (described above). This step should be performed immediately after step 4.

6. Continue mixing while applying heat to the mixture, slowly raising the temperature of the mixture to within the range of approximately 185° F.–195° F. (85° C.–90.5° C.). Continue mixing and maintain the mixture within the temperature range for approximately 30 minutes (the thermal processing period).

It should be appreciated that the temperature of the mixture is maintained within the 185° F.–195° F. temperature range to assure full hydrolysis of the polymers.

The homogenization process immediately follows the 30-minute thermal processing period. During this process the mixture is chilled to assure that cooling occurs within a 30-minute window. It should be appreciated that extended cooling periods (i.e., cooling periods exceeding 30 minutes) may not yield a completely homogenized mixture. Accordingly, it is preferred that a heat exchanger be used to control the cooling. The homogenization process is comprised of the following steps:

1. Continue mixing and discontinue heating of the mixture.

2. Continue mixing vigorously, while cooling the mixture to approximately 72° F. (22.22° C.).

3. Stop mixing and transfer the resulting air-entraining agent to drums or pails.

It should be understood that the mixture should be cooled to 72° F. (22.22° C.) within 30 minutes, otherwise complete homogenization may not occur. Furthermore, it may be necessary to increase the mixing speed during the cooling period, since the mixture will thicken.

Table 5 sets forth a list of basic ingredients and basic properties for an air-entraining agent according to the second preferred embodiment of the present invention. It will be appreciated that the properties are very similar to those of the air-entraining agent described in Table 4.

TABLE 5

AIR-ENTRAINING AGENT ACCORDING TO A SECOND PREFERRED EMBODIMENT

|  |  | % by weight |
| --- | --- | --- |
| Water | 733.5 lbs. (332.72 kg.) | 76.7% |
| Bentonite | 11.0 lbs. (4.99 kg.) | 1.2% |
| Natural High-Polymer Protein Powder | 34.0 lbs. (15.42 kg.) | 3.6% |
| PVA Powder | 35.5 lbs. (16.10 kg.) | 3.7% |
| Soap Gel Solution | 142.0 lbs. (64.41 kg.) | 14.9% |
| Batch Wt. | 956.0 lbs. (428.65 kg.) |  |
| Specific Gravity | 1.047 (where $H_2O = 1$) |  |
| pH | 8.5–9.5 |  |
| Solubility | good with water |  |
| Color | milk white to tan |  |
| Odor | slight |  |

It will be appreciated that the weight of the Bentonite will be generally about 1% of the total weight of the air-entraining agent. The weight of the high-polymer protein powder may range between approximately 2%–12% of the total weight of the air-entraining agent. The weight of the PVA powder may range between approximately 2%–12% of the total weight of the air-entraining agent. Furthermore, the soap gel solution may range between approximately 10%–25% of the total weight of the air-entraining agent. The addition or subtraction of any percentage value (i.e., the high-polymer protein powder and soap gel solution) is compensated by an adjustment to the water content of the air-entraining agent to achieve a yield of 110 gallons (416.39 L).

The air-entraining agent is produced as a concentrate. Accordingly, as a direct dosage admixture, it should be diluted with water at a rate of one part water to one part admixture. This method of introduction should generally be used in PC/fly ash mixtures which include aggregates such as stone, gravel, sand or combinations thereof. The action of the aggregate materials during mixing within the fluid paste of a PC/fly ash mixture dosed with the chemical air-entraining agent of the present invention, causes the air-voids to be formed.

Where the air-entraining agent of the present invention is utilized as a pre-formed foam, the air-entraining agent should be diluted by mixing one part admixture to approximately 20–40 parts water. Generally, a pre-formed foam is used for air-entrainment of neat PC/fly ash mixtures. Since neat PC/fly ash mixtures do not contain aggregate particles (e.g., sand and gravel) which aid air-entrainment during mixing, foam becomes the ideal method of introducing an air-void system.

The air-entraining agent of the present invention is contemplated for use in numerous mix designs, including mix designs for flowable backfill compositions comprising Class F fly ash, which is high LOI or high carbon fly ash, a binder, entrained air, and water. While the binder is typically Portland cement because of its ready availability, possible binders also include lime, slag cement and cementitious Class C fly ash. This flowable backfill composition could be considered one type among a family of materials known as CLSMs (Controlled Low Strength Materials) as defined by the American Concrete Institute (ACI) Committee 229. The terms CLSM is defined by the ACI Committee 229 as a flowable, cementitious material used primarily as a flowable backfill in lieu of compacted fill. The ACI Committee 229 has set an upward limit for compressive strength of CLSMs to be 1200 psi (8.3 MPa). However, most applications to date require maximum unconfined compressive strength of only 300 psi (2.1 MPa) or less, since lower strength is necessary to allow future excavation of the material.

Flowable backfill compositions find use as pavement base in highway construction, pipe beddings, backfill for segmented retaining walls, landfill stabilization, etc. In addition, flowable backfill compositions can be injected into abandoned mines to control subsidence, abandoned underground tank fills, and approach fills for bridges.

As noted earlier, the physical properties of the composition can be changed by changing the volume of air entrained therein. In this respect, changes to the volume of air entrained leads to changes in characteristics such as workability, durability, density, compressive strength, dispersion, plasticity, flow, freeze-thaw and permeability.

The minute air bubbles produced by the air-entraining agent act as additional "fine aggregate". Accordingly, the workability of the concrete mix is increased with additional air bubbles. Furthermore, the additional volume of air reduces the capillarity of hardened concrete also improving workability and durability.

The entrained air can work as a dispersing agent to hold the component materials in homogeneous suspension during the consolidation and set periods, thus eliminating bleed and subsidence.

In addition, the entrained air works as a plasticizer by allowing the composition to flow with reduced water.

Moreover, the entrained air improves the plasticity characteristics of a backfill composition at lower water to binder/filler ratios. By lowering the binder/filler ratios yet maintaining good flowability, allows the backfill composition to achieve higher strengths from relatively small percentages of binder materials. This provides a cost savings due to the reduced use of binder materials.

Freeze-thaw properties are also enhanced by the entrained air. In this respect, the detrimental effects of freeze and thaw are better resisted, since air voids in the mass allow forming ice lances space to expand, without destroying the cohesive matrix of the backfill composition. If subjected to rapid freeze when saturated, dense low strength materials will deteriorate rapidly.

Furthermore, the entrained air affects the permeability of the resulting mass. In this respect, the entrained air acts similar to a water reducing agent. This allows good flowability and workability at reduced water contents, resulting in a limited capillary void matrix in the hardened fill.

The foregoing description are specific embodiments of the present invention. It should be appreciated that these embodiments are described for purposes of illustration only and that numerous alterations and modifications may be practiced by those skilled in the art without departing from the spirit and scope of the invention. It is intended that all such modifications and alterations be included insofar as they come within the scope of the invention as claimed or the equivalents thereof.

The invention claimed is:

1. An air-entraining agent for entraining air in a cementitious mixture having fly ash comprising:
   2%–12% by weight of a high-polymer protein powder;
   about 60% by weight of a polyvinyl alcohol solution;
   10%–25% by weight of a aqueous soap solution; and
   water in a quantity equal to the remaining percentage weight of said air-entraining agent.

2. The air-entraining agent according to claim 1, wherein said polyvinyl alcohol solution is comprised of:
   2%–12% by weight of a polyvinyl alcohol powder; and
   water in a quantity equal to the remaining percentage weight of said polyvinyl alcohol solution.

3. The air-entraining agent according to claim 1, wherein said polyvinyl alcohol solution is a medium viscosity weight average molecular weight solution.

4. The air-entraining agent according to claim 1, wherein said polyvinyl alcohol solution is a high viscosity weight average molecular weight ,solution.

5. The air-entraining agent according to claim 1, wherein said soap solution is comprised of:
   15%–35% by weight of an acidic rosin;
   an alkali in the range of 8%–12% of said acidic rosin weight; and
   water in a quantity equal to the remaining percentage weight of said soap solution.

6. The air-entraining agent according to claim 5, wherein said acidic rosin has a minimum acid number of 162 and a maximum fatty (oleic) acid content of 3%.

7. The air-entraining agent according to claim 5, wherein said alkali is a metal salt.

8. The air-entraining agent according to claim 7, wherein said metal salt is selected from the group consisting of sodium hydroxide and potassium hydroxide.

9. The air-entraining agent according to claim 5, wherein said acidic rosin and said alkali react to form a soap.

10. An air-entraining agent for entraining air in a cementitious mixture having fly ash comprising:
    3.6% by weight of a high-polymer protein powder;
    59.6% by weight of a polyvinyl alcohol solution;
    15.0% by weight of a aqueous soap solution; and
    21.8% by weight of water.

11. The air-entraining agent according to claim 10, wherein said polyvinyl alcohol solution is comprised of:
    5.9% by weight of polyvinyl alcohol powder; and
    94.1% by weight of water.

12. The air-entraining agent according to claim 10, wherein said soap solution is comprised of:
    25.4% by weight of an acidic rosin;
    2.5% by weight of an alkali; and
    72.1% by weight of water.

13. A method of producing an air-entraining agent admixture for use in a cementitious mixture having fly ash, said method comprising:
    (a) in a mixing vessel, adding to the vessel by weight percent of the admixture a predetermined quantity of water, at a temperature in the range of approximately 140° F. to 150° F.;
    (b) mixing the water and adding to the mixing vessel by weight percent of the admixture 2%–12% of a high-polymer protein powder;
    (c) mixing the vessel contents for approximately 30 minutes;
    (d) adding to the mixing vessel by weight percent of the admixture about 60% of a polyvinyl alcohol aqueous solution, while continuing to mix the vessel contents;
    (e) mixing the vessel contents for approximately an additional 15 minutes;
    (f) adding to the mixing vessel by weight percent of the admixture 10%–25% of a aqueous soap solution; and
    (g) mixing the vessel contents for approximately an additional 1.25 hours.

14. An air-entraining agent for entraining air in a cementitious mixture having fly ash comprising:
    about 1% by weight of a colloid;
    2%–12% by weight of a high-polymer protein powder;
    2%–12% by weight of a polyvinyl alcohol powder;
    10%–25% by weight of a aqueous soap solution; and
    water in a quantity equal to the remaining percentage weight of said air-entraining agent.

15. The air-entraining agent according to claim 14, wherein said colloid is Bentonite.

16. The air-entraining agent according to claim 14, wherein said soap solution is comprised of:
    15%–35% by weight of an acidic rosin;
    an alkali in the range of 8%–12% of said acidic rosin weight; and
    water in a quantity equal to the remaining percentage weight of said soap solution.

17. The air-entraining agent according to claim 16, wherein said acidic rosin has a minimum acid number of 162 and a maximum fatty (oleic) add content of 39.

18. The air-entraining agent according to claim 16, wherein said alkali is a metal salt.

19. The air-entraining agent according to claim 18, wherein said metal salt is selected from the group consisting of sodium hydroxide and potassium hydroxide.

20. The air-entraining agent according to claim 16, wherein said acidic rosin and said alkali react to form a soap.

21. An air-entraining agent for entraining air in a cementitious mixture having fly ash comprising:

1.2% by weight of a colloid;

3.6% by weight of a high-polymer protein powder;

3.7% by weight of a polyvinyl alcohol powder;

14.9% by weight of a aqueous soap solution; and 76.7% by weight of water.

22. The air-entraining agent according to claim 21, wherein said soap solution is comprised of:

25.4% by weight of an acidic rosin;

2.5% by weight of an alkali; and 72.1% by weight of water.

23. The air-entraining agent according to claim 21, wherein said colloid is Bentonite.

24. A method of producing an air-entraining admixture for use in a cementitious mixture having fly ash, said method comprising:

(a) in a mixing vessel, adding to the vessel by weight percent of the admixture a predetermined quantity of water, at a temperature in the range of approximately 55° F.–65° F.;

(b) mixing the water and adding to the mixing vessel by weight percent of the admixture about 1% of a colloid;

(c) mixing the vessel contents for approximately 15 minutes;

(d) mixing into the taking vessel by weight percent of the admixture approximately 10%–25% of a aqueous soap solution;

(e) mixing into the mixing vessel by weight percent of the admixture approximately 2%–12% of a high-polymer protein powder;

(f) mixing into the mixing vessel by weight percent of the admixture approximately 2%–12% of a polyvinyl alcohol powder;

(g) mixing the vessel contents and heating the vessel contents to a temperature approximately in a range between 185° F. to 195° F.;

(h) mixing the vessel contents and maintaining the vessel contents within the temperature range for approximately 30 minutes.

25. The method of producing an air-entraining admixture according to claim 24, said method further comprising:

mixing the vessel contents and cooling the vessel contents to approximately 72° F. within 30 minutes.

26. An air-entraining agent for entraining air in a cementitious mixture having fly ash comprising:

a high-polymer protein powder;

a polyvinyl alcohol solution;

a aqueous soap solution; and water.

27. An air-entraining agent according to claim 26, wherein said high-polymer protein powder is between approximately 2% and 12% of the total weight of the air-entraining agent.

28. An air-entraining agent according to claim 26, wherein said polyvinyl alcohol solution is approximately 60% of the total weight of the air-entraining agent.

29. An air-entraining agent according to claim 26, wherein said soap solution is between approximately 10% and 25% of the total weight of the air-entraining agent.

30. An air-entraining agent according to claim 26, wherein said polyvinyl alcohol solution is comprised of polyvinyl alcohol powder and water.

31. An air-entraining agent according to claim 26, wherein said soap solution is comprised of an acidic rosin and an alkali.

32. An air-entraining agent according to claim 31, wherein said acidic rosin and said alkali react to form a soap.

33. An air-entraining agent for entraining air in a cementitious mixture having fly ash comprising:

a colloid;

a high-polymer protein powder;

a polyvinyl alcohol powder;

a aqueous soap solution; and water.

34. An air-entraining agent according to claim 33, wherein said colloid is Bentonite.

35. An air-entraining agent according to claim 33, wherein said soap solution is comprised of:

an acidic rosin; and an alkali.

* * * * *